US008629756B2

(12) United States Patent
Al-Mutairi

(10) Patent No.: US 8,629,756 B2
(45) Date of Patent: Jan. 14, 2014

(54) ELECTRONIC SEAL SYSTEM

(76) Inventor: Jarrah Ali Abdullah Al-Mutairi, Al-Jahra (KW)

(*) Notice: Subject to any disclaimer, the term of this patent is extended or adjusted under 35 U.S.C. 154(b) by 304 days.

(21) Appl. No.: 13/230,955

(22) Filed: Sep. 13, 2011

(65) Prior Publication Data

US 2013/0063245 A1    Mar. 14, 2013

(51) Int. Cl.
*G05B 19/00* (2006.01)
(52) U.S. Cl.
USPC .......... 340/5.53; 340/5.52; 713/176; 713/186
(58) Field of Classification Search
USPC ......... 340/5.53, 5.52; 101/405, 333; 713/176, 713/186
See application file for complete search history.

(56) References Cited

U.S. PATENT DOCUMENTS

| | | | |
|---|---|---|---|
| 4,553,837 A | 11/1985 | Marcus | |
| 5,625,448 A | 4/1997 | Ranalli et al. | |
| 5,956,409 A * | 9/1999 | Chan et al. | 380/54 |
| 6,298,805 B1 | 10/2001 | Arndt | |
| 6,317,834 B1 * | 11/2001 | Gennaro et al. | 713/186 |
| 6,360,661 B1 * | 3/2002 | Cheung | 101/333 |
| 7,110,576 B2 | 9/2006 | Norris, Jr. et al. | |
| 7,831,066 B2 | 11/2010 | Kocher | |
| 2003/0182151 A1 * | 9/2003 | Taslitz | 705/1 |
| 2004/0100363 A1 * | 5/2004 | Lane et al. | 340/5.86 |
| 2008/0209516 A1 * | 8/2008 | Nassiri | 726/3 |
| 2012/0061461 A1 * | 3/2012 | Bourrieres et al. | 235/375 |

* cited by examiner

*Primary Examiner* — Eric M Blount
(74) *Attorney, Agent, or Firm* — Lowe Hauptman & Ham, LLP

(57) ABSTRACT

An electronic seal system uses fingerprint recognition to prevent use by an unauthorized person and includes a mechanism for remotely destroying a stolen or missing seal. The system includes a fingerprint module for collecting an image of a fingerprint of an authorized individual. In addition, a processor for carrying out a comparison of a scanned fingerprint and a stored image of an authorized fingerprint is provided. The system also includes a printable seal for sealing a document and includes a mechanism for activating the system when a scanned fingerprint matches a stored image of a fingerprint and for deactivating the seal when the fingerprints do not match. Further, a preferred embodiment of the invention provides a time, date and location receiver for receiving signals from a GPS and automatically numbering and printing mechanism for printing the time, date, location and document numbers and seal on each page to which a seal is provided.

7 Claims, 4 Drawing Sheets

ELECTRONIC SEAL SYSTEM

FIELD OF THE INVENTION

This invention relates to an electronic seal system and more particularly to an electronic seal system that uses fingerprint recognition to prevent unauthorized use of a seal and means for remotely destroying a missing seal.

BACKGROUND OF THE INVENTION

Over the past ten or so years there has been an increased interest in the use of biometric measurements as a legal seal for authenticating legal documents. For example a U.S. Patent Application Publication of Taslitz No. 2003/0182151 discloses a Method of Using Biometric Measurements as a Legal Seal for Authenticating Real Estate Deeds and Mortgages. As disclosed a method for providing an electronic seal to a real estate deed, mortgage or land trust document using a biometric measurement of the original signer to the document, which biometric measurement is stored in a central computer for access at a future date when such document is presented for transaction. The software of the system of the invention generates an authorization code or number representative of the stored unique biometric measurement, which code is then physically placed on or inserted into the document evidencing the biometric seal of the user. The correlating code is unique to the document and the stored biometric seal therefore. The unique biometric measurement is "married" to the legal document to provide a "legal seal" and obviate the use of mechanical, waxed, embossed or printed seals. This biometric seal provides the guarantee to the financial institution or other party in the legal transaction that the person who has signed the document and provided a biometric measurement is indeed the actual person that he or she claims to be.

A more recent disclosure of Norris, Jr. et al. in U.S. Pat. No. 7,110,576 discloses a System and Method for Authenticating A Mailpiece Sender. The patent discloses a method and system for authenticating the sender of a mailpiece for identifying certain mailpieces as originating from known trusted senders. In one configuration, biometric information and/or biometric metadata is captured when a user writes on a mailpiece with a digital pen. This data is then compared to reference data in a database. Registrant data is then loaded into a storage device on the mailpiece and may be digitally signed and/or encrypted by a trusted third party. In another configuration, a mailpiece includes the signature of a sender and the biometric data includes authentication data obtained from the signature that is compared to the biometric data related to the signature obtained during a sender registration process.

Further a U.S. Pat. No. 7,483,552 of Pomerantz et al. discloses a method for preventing signature repudiation. The method sees a user's fingerprint and embeds special markings on the document being signed. This method then transmits the information regarding the signing of the document, such as images of the document, fingerprints, times and locations of the signing to a third party receiver.

In addition, a pocket identification collection kit U.S. Pat. No. 7,831,066 discloses a kit that is compact for fitting in a pocket and has means for rapidly collecting and recording identification information of personnel in their field and processing collected information in a computer processing station. The kit provides means for linking collected and recorded biometric data of individuals through the use of a photographic image and a unique identifier. Complete biometric data, photographic data and biographical information are processed into internationally accepted and law enforcement standards are later used. A method that allows personnel to rapidly collect, record and link types of identification information and later process collected in a secured location.

Such interests extend well beyond the United States as evidenced by a Korean Patent Application No. KR20070064887 and two Chinese Patent Applications CN101329776 and CN101417561. The Korean application of Quibin Zhong (CN)+ discloses an electronic seal system using fingerprint recognition is provided to prevent illegal use of a missing seal by providing the electronic seal data to a user identified through the fingerprint recognition and facilitate tracing/management of use records by storing the use records. A storing part stores personal and level information of an identified registrant, fingerprint data used for authenticating the user, and electronic seal data of a company including the registrant. A fingerprint recognizer generates the fingerprint data by detecting a fingerprint of the user. A determiner outputs the electronic seal data if the fingerprint data received from the fingerprint recognizer is identical with the fingerprint data read from the storing part and the level information of the authenticated user is over a predetermined level a printing part prints a sealed image corresponding to the electronic seal data on a signature column of a document through an inkjet mode.

The first Chinese application of Jie Yang (CN) and Chenglin Qui discloses a fingerprint seal system and a method. The system comprises a fingerprint module for collecting fingerprint images, a processor for carrying out a comparison between different fingerprints and managing the information of the seal, an electronic latch for receiving results of the comparison between different fingerprints and starting up the rotation of a gear shifting stepping motor, a mechanical transmission device and a seal installed on the mechanical transmission device. When a user needs to use the seal for sealing, the user can start up the fingerprint seal system, a fingerprint is pressed on a fingerprint sensor to collect the fingerprint image when the user having the authority to open the seal is judged by a central processor in the fingerprint module. If the user has the authority, the fingerprint module emits an opening signal to the motor of the transmission mechanism and the sealing is completed by a motor interlocking transmission mechanism and then the fingerprint module records managing information of using the seal such as user information, the sealing time and the accumulated sealing times etc.

The second Chinese application of Quibin Zhong discloses a fingerprint electric identification stamp. As disclosed, the electronic seal can be normally used only by fingerprint identification. The seal comprises a seal body and a sheath body. A fingerprint scanner is arranged in the cavity of a seal head and the seal body, a fingerprint identification circuit, an electric machine release mechanism and a battery are arranged wherein the scanner is connected with the fingerprint identification circuit, the output end of which is connected with the micromachine in the electric machine release mechanism and the micromachine is connected with a roof bar outside the micromachine by a transmission mechanism. The seal body is positioned outside the roof bar and cut with a groove; the sheath body is sheathed outside the seal body and adheres to the external periphery of the seal body and provides with a fixture block in the middle, the fixture block is provided with a spring and inserted in the groove of the seal body and leans against the roof bar outside the micromachine, the bottom surface of the seal body is higher than the bottom of the sheath body and an offsetting spring is arranged between the seal body and the sheath body. The electronic seal is characterized by a simple and novel structure and normal availability only by fingerprint scanning.

Notwithstanding the above, it is presently believed that there is a need and a potential commercial market for an improved electronic seal that uses fingerprint recognition to prevent use of an unauthorized person combined with means for remotely destroying a missing seal. The seal in accordance with the present invention includes a fingerprint module for collecting an image of a fingerprint of an authorized individual and a processor for carrying out a comparison of a second fingerprint with a stored image of an authorized individual's fingerprint. In addition, the seal in accordance with the present invention includes a plurality of remotely heatable wires for destroying a missing seal.

BRIEF SUMMARY OF THE INVENTION

In essence, the present invention contemplates an electronic seal system using fingerprint recognition to prevent use by an unauthorized person and means for remotely destroying a missing seal. The system comprises and/or consists of a fingerprint module for collecting an image of a fingerprint of an authorized individual. A processor for carrying out a comparison of a scanned fingerprint and a stored image of an authorized fingerprint is provided. The system also includes a printable seal for sealing a document, and means for activating a seal when a scanned fingerprint matches a stored image of a fingerprint and for deactivating the seal when the fingerprints do not match.

In a preferred embodiment of the invention, a time, date and location receiver for receiving signals from a GPS, an automated numbering system and printing means for printing the time, date, location and document numbers and seal on each document to which a seal is applied is provided.

Further a reservoir may include means for storing a supply of printing ink in the reservoir and an indicator for indicating the amount of ink in the reservoir. In addition, the seal includes a plurality of remotely heatable metal wires and means for remotely heating the metal wires to destroy the seal is included.

The invention will now be described in connection with the accompanying drawings wherein like reference numerals have been used to indicate like parts.

DESCRIPTION OF THE PREFERRED EMBODIMENTS OF THE INVENTION

Figure 1:
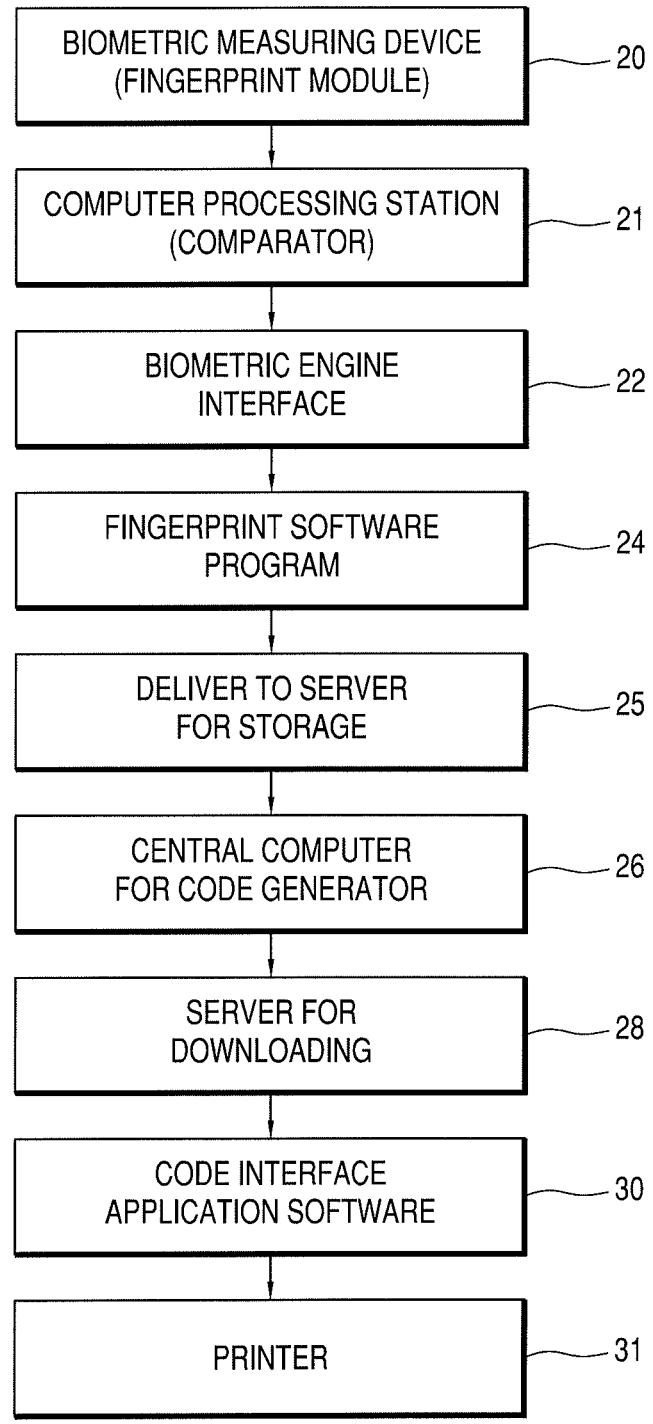
FIG. 1 is a block diagram illustrating a system for applying a seal that includes verification by an image of an authorized fingerprint.

As illustrated in FIG. 1 an electronic seal system according to the present invention uses fingerprint recognition to prevent use by an unauthorized person. The system includes a biometric measuring device such as a fingerprint module 20 for collecting and storing an image of a fingerprint of an authorized individual. The collection of a fingerprint may be done by conventional techniques. As for example, by use of a pocket identification collection kit as described in a U.S. Pat. No. 7,831,066 of Robert Kocher. As disclosed therein, a compact group of components includes means for rapidly collecting and recording identification information of personnel in the field and processing collected information at a computer processing station. The kit also includes means for linking a collected and recorded fingerprint of an individual through use of photographs and unique identifiers. The photographic image of a fingerprint and unique identifier are processed into internationally accepted and law enforcement standards for later use. The Kocher patent is incorporated herein it its entirety by reference.

The system in accordance with the present invention also includes a processor 21 for carrying out a comparison of a scanned fingerprint of an individual and a stored image of an authorized fingerprint. The read and/or scanned data is input to a biometric engine interface 22 where the fingerprint measuring data is delivered to a fingerprint engine software application program 24 where the data is generated in a conventional manner as for example as disclosed in the U.S. Patent Application Publication No. 2003/0182151 that is incorporated herein in its entirety by reference.

The biometric data is then delivered to a server 25 for storage in a central computer or flash drive. Associated with the central computer is a fingerprint correlation code generator 26, which generates a specific code representative of the fingerprint date. The code generator 26 generates a code that is unique to the signer's fingerprint and the document which was signed whereby the fingerprint for the particular signer for a specific document is identified. The code may be a serial number, document number or the like that associates an address in the memory bank of the computer storage. After generating the correlation code the code is sent to a server 28 for downloading to a code interface application software 30 which delivers the code to a correlation code generator 30 for example a printer. Then the code generator 30 prints the code on the physical document 32. This serves to specifically identify the signature on the specific document but also serves as an electronic seal.

Figure 2:
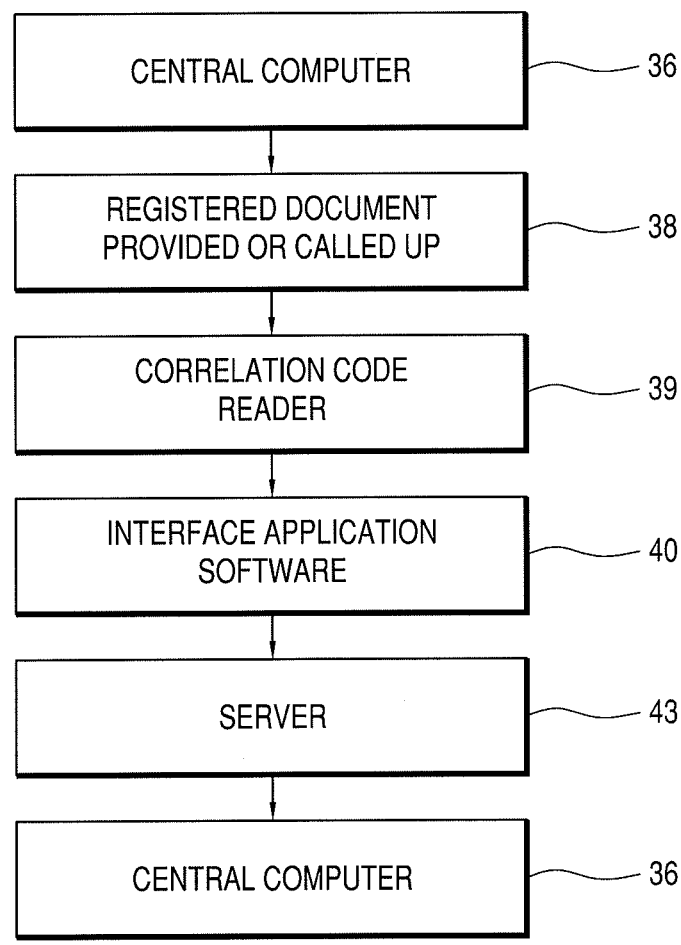
FIG. 2 is a block diagram illustrating a system for comparing a scanned fingerprint of an individual with a stored image of an authorized fingerprint.

Referring now to FIG. 2, there is shown a system of the invention used for preventing fraud by insuring that the presenter of a legal document where one who claims to have signed such a document is the actual person whose signature is on the document. The document 38 may be presented to, or called up by a bank, title or mortgage company many years after being registered with a data bank and stored in a central computer 36. In order to ensure there is no fraud and that the person presenting the document or claiming to have signed the document is the same person whose signature is on the document or other physical representation of a biometric correlation code is read, scanned or otherwise detected by means of a code reader device 39. The code reader device 39 may simply be an optical scanner, bar code scanner or the like in the case where the original signed document is not later presented during a transaction then the authorized code need only be entered by keyboard or the like. The information from the reader device 39 or other input device is input to a code interface application software 40 and sent to the server 43 for delivery to the central computer 36.

At the time that the authorization or serial number or other physical representation is read or presented, the person present is biometrically measured as for example by a scanned fingerprint. The fingerprint is sent to a biometric engine interface and biometric engine application software. The data is sent to server 43 for delivering to the central computer 36. Conventional comparator application software compares the biometric data received from the fingerprint measuring device with the stored fingerprint measuring device. It is noted that the algorithmic criteria for determining the identical match may use one or more different measurements in a similar manner to that disclosed in U.S. Pat. No. 6,256,737 of Bianco et al. incorporated herein in its entirety by reference.

It may therefore be seen that the process of the invention provides that the actual, hard copy of the document contains an authorization or serial code which would enable anyone involved in a future transaction involving the same documents to access the fingerprint to verify that the parties involved and any further transactions relate to the same documents matched their fingerprint seals. For example, if an individual purchases property and "seals" the closing document that scans his fingerprint and transfers it electronically to a computer along with a copy of the closing document as described above the software then stores the fingerprint attached to a file of the scanned closing document and issues an authorization number or document number as described above. The software would then issue the data and immediately send it to the parties at the transaction. The authorization number would then be physically inserted into the hard copy of the document as an electronic seal.

When the individual sells his property he would then have to have the fingerprint scanned again for a new set of closing documents which could then be compared through the software of the biometric data on file from the initial transaction if the seals match the identity it would be confirmed and the transaction would go forward. If the biometric data did not match with the stored data the transaction would not go through.

An important element in the present invention relates to means for electronically destroying a seal that is either missing, stolen or otherwise misplaced. This means involves a plurality of heatable wires that are heatable from a remote location. The remote location relies on a global positioning system (GPS) to transmit a signal that heats a plurality of wires to destroy the face of the seal or merely the fingerprint that has been recorded.

Figure 3:
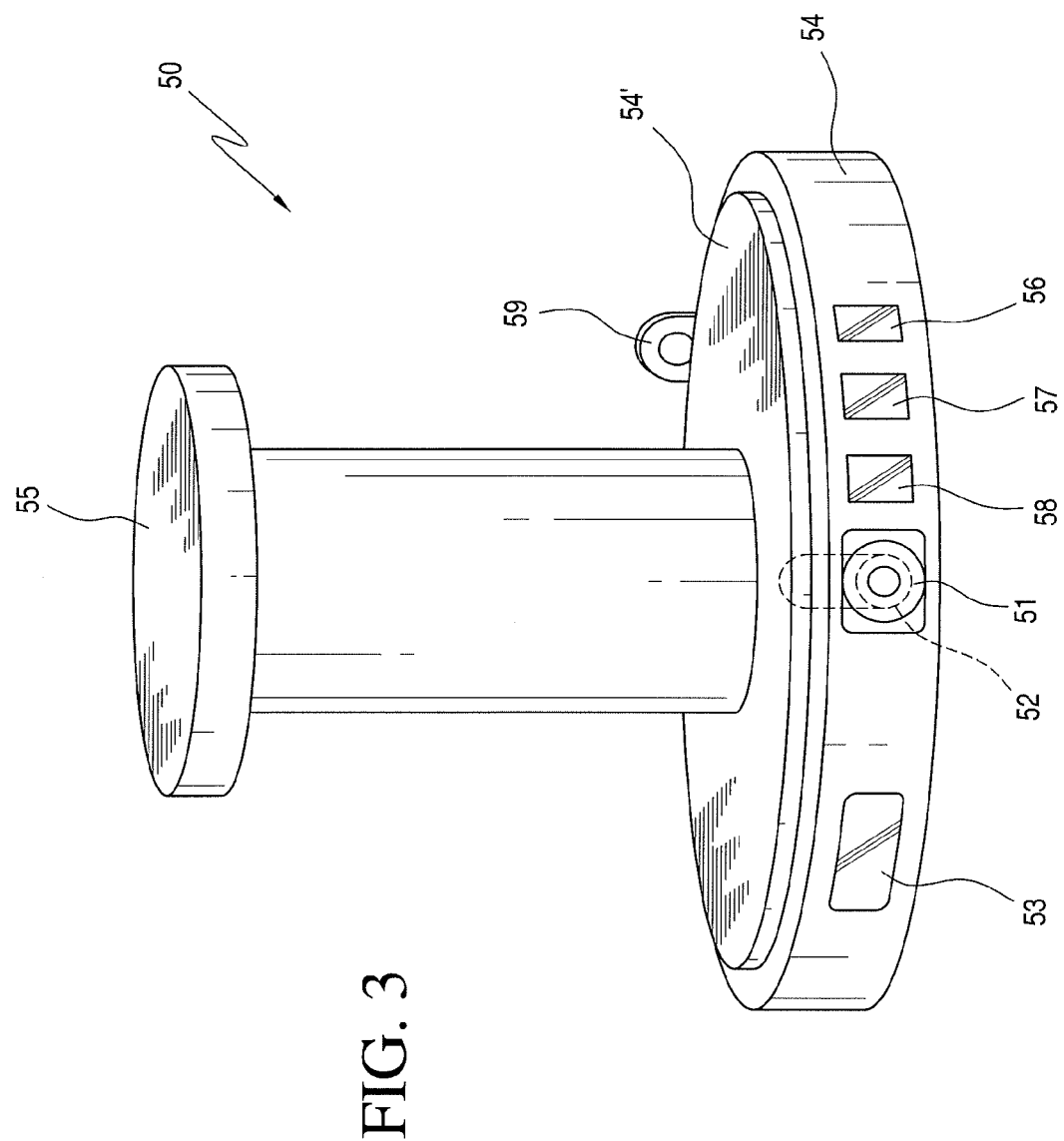
FIG. 3 is a schematic illustration of a seal in accordance with a first embodiment of the invention.
Figure 4:
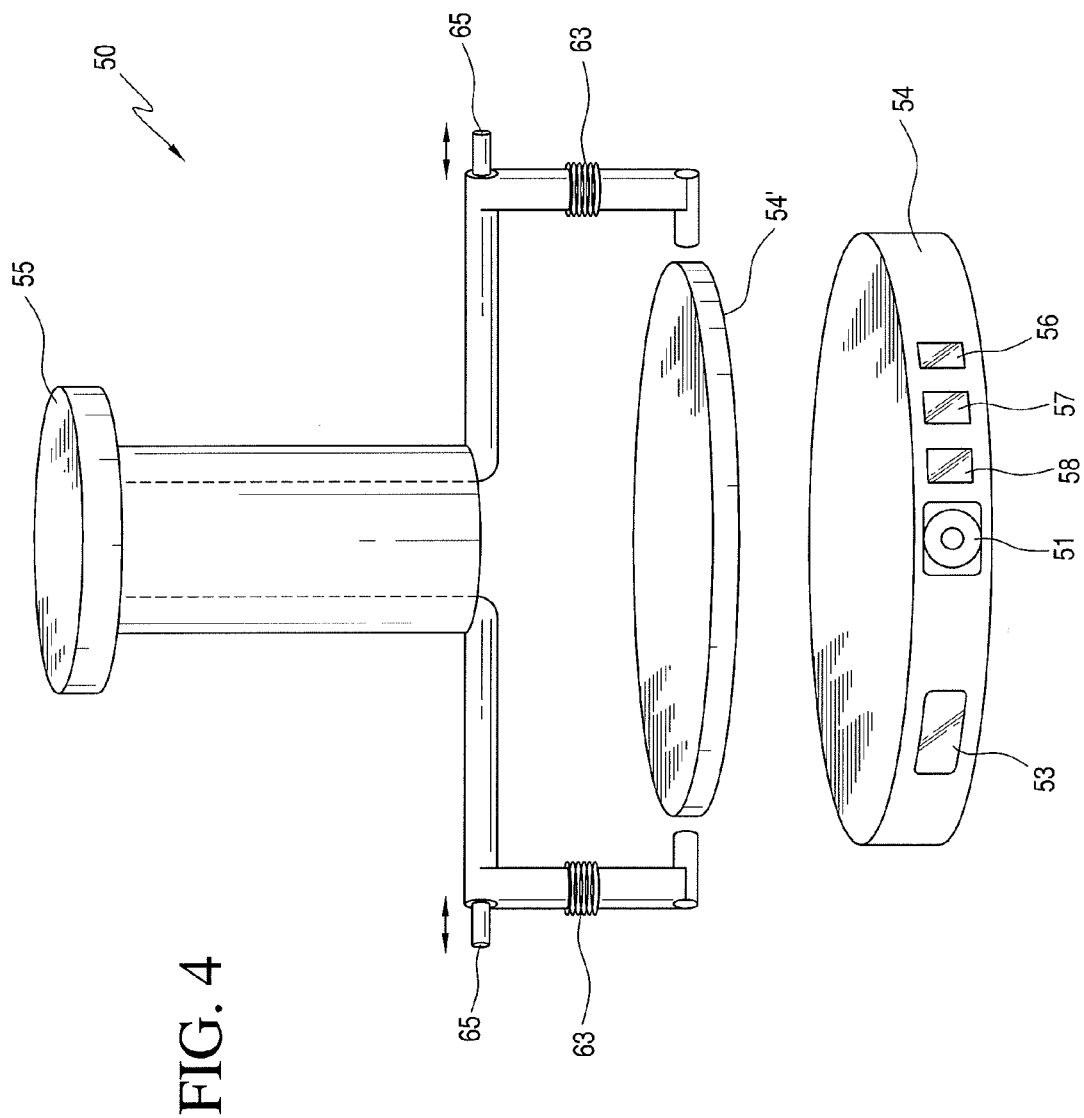
FIG. 4 is a schematic illustration of a seal in accordance with a preferred embodiment of the invention.

As shown in FIGS. 3 and 4, an electronic seal 50 consists of a print reader 51, a scanner 52 includes a lens and a printer that prints the date, time and location on each page of a document as well as a document identification number that bears a seal shown in a window 53. A dynamic part of the seal 54' (see FIG. 4) is disposed inside of an outer housing 54.

The dynamic part 54' of the seal 50 is movable downwardly to print a copy of the seal on a document by pressing down on an imprinter 55 when a fingerprint of a user matches a stored image of an authorized user. Under these circumstances a locking mechanism 65 is released and the dynamic part of the electronic seal is free to imprint a copy of the seal on a document by compressing a pair of springs 63. The seal further includes a plurality of windows 56, 57 and 58 in the outer housing 54. The first window 56 includes a gauge to indicate the amount of ink in a reservoir, a second window 57 displays the document identification number while the third window 58 displays the number of pages in the document. Finally, a GPRS 59 provides the location of a lost or misplaced seal.

A sensor ray is initiated as soon as the dynamic part goes down and the paper is scanned and stored on a slide or flash drive. A copy of the seal is provided and stored in memory as well as the automatic numbering device. The second phase of the program is specialized to set the copy of the seal (signature) that is part of the dynamic part that is conducted by pressing the seal downward.

While the invention has been described in connection with its preferred embodiments it should be recognized that changes and modifications may be made therein without departing from the scope of the appended claims.

What is claimed is:

1. An electronic seal system using fingerprint recognition to prevent use by an unauthorized person and means for remotely destroying a missing seal, said system comprising:
   a fingerprint module for collecting and storing an image of a fingerprint of an authorized individual;
   a processor for carrying out a comparison of a scanned fingerprint of an individual and a stored image of an authorized fingerprint;
   a printable seal for sealing a document, means for activating a mechanism and seal when the second fingerprint matches the stored image and for deactivating the mechanism and seal when the fingerprints do not match;
   a time, data and location receiver for receiving the signals from a global positioning satellite (GPS), an automated numbering system and printing means for printing the time, data, location and document number and seal on each document to which a seal is applied;
   a scanner and storage means for scanning said sealed document and storing scanned information in said storage means;
   a reservoir and a supply of printing ink and means for storing said supply of printing ink in said reservoir and an indicator for indicating the amount of ink in said reservoir; and
   a plurality of remotely heatable metal wires across said seal and means for remotely heating said metal wires to thereby destroy said seal.

2. An electronic seal system using fingerprint recognition to prevent use by an unauthorized person and means for remotely destroying a missing seal according to claim 1 which includes means including said seal for impressing said seal into said document.

3. An electronic seal system using fingerprint recognition to prevent use by an unauthorized person and means for remotely destroying a missing seal according to claim 2 in which the fingerprint of two authorized fingerprints are stored in said system and in which a matching second signature of either or both activate the seal.

4. An electronic seal system using fingerprint recognition to prevent use by an unauthorized person and means for remotely destroying a missing seal according to claim 3 in which said seal includes a static part and a dynamic part including said seal and wherein said means for impressing said seal into a document includes a pair of coil springs.

5. An electronic seal system using fingerprint recognition to prevent use by an unauthorized person and means for remotely destroying a missing seal according to claim 4 in which said means for activating a seal when the scanned fingerprint matches the stored image and for deactivating the seal when the fingerprints do not match includes a retractable steel pin passing through a portion of said static part and into a portion of said dynamic part.

6. An electronic seal system using fingerprint recognition to prevent use by an unauthorized person and means for remotely destroying a missing seal according to claim 5 which includes a rechargeable battery for powering said system and a solar cell for recharging said battery.

7. An electronic seal system using fingerprint recognition to prevent use by an unauthorized person and means for remotely destroying a missing seal, said system consisting of:
   a fingerprint module including a finger rest for positioning a finger for forming an image and for scanning a fingerprint for collecting an image of a fingerprint of an authorized individual and memory means for storing the image of the authorized individual;

a processor for carrying out a comparison of a scanned fingerprint and a stored image of an authorized fingerprint;

a printable seal for sealing a document, means for activating a seal when a second scanned fingerprint matches a stored image and for deactivating the seal when the fingerprints do not match and wherein said means includes a static assembly and a dynamic assembly and wherein a removable metal pin locks the static and dynamic assembly to prevent movement of the dynamic assembly;

a time, date and location receiver for receiving signals from a GPS, an automated numbering system and means including said printer for printing the time, date, location and document number and seal on each document to which a seal is applied;

means including a separate scanner and a flash drive storage means for scanning and storing an image of each sealed document including the document number, time, date and location and seal on each document;

a reservoir and a supply of printers ink in said reservoir and an indicator for indicating the amount of ink in said reservoir;

a rechargeable battery for powering said seal and a solar cell for recharging said battery; and a plurality of remotely control heatable wires for destroying said seal.

* * * * *